United States Patent
Goff et al.

(10) Patent No.: US 11,659,414 B1
(45) Date of Patent: *May 23, 2023

(54) CONNECTIVITY APPARATUS FOR REMOTE CELL TOWER INTEGRATION

(71) Applicant: USA Intellectual Property Holding, Inc., Sarasota, FL (US)

(72) Inventors: James Earl Goff, Bradenton, FL (US); John P. Vajanyi, III, Bradenton, FL (US)

(73) Assignee: USA Intellectual Property Holding, Inc., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/449,037

(22) Filed: Sep. 27, 2021

Related U.S. Application Data

(60) Division of application No. 16/566,479, filed on Sep. 10, 2019, now Pat. No. 11,134,399, which is a continuation of application No. 16/104,304, filed on Aug. 17, 2018, now Pat. No. 10,462,683.

(60) Provisional application No. 62/546,614, filed on Aug. 17, 2017.

(51) Int. Cl.
*H04W 24/00* (2009.01)
*H04W 24/02* (2009.01)
*H04L 43/10* (2022.01)
*H04W 24/04* (2009.01)

(52) U.S. Cl.
CPC .............. *H04W 24/02* (2013.01); *H04L 43/10* (2013.01); *H04W 24/04* (2013.01)

(58) Field of Classification Search
None
See application file for complete search history.

(56) References Cited

U.S. PATENT DOCUMENTS

2014/0115175 A1*  4/2014  Lublin ................ H04L 9/40
                                                                   709/228

* cited by examiner

*Primary Examiner* — Suhail Khan
(74) *Attorney, Agent, or Firm* — Smith & Hopen, P.A.; Owen G. Behrens; Paul Murty

(57) ABSTRACT

A connectivity apparatus and system for upgrading cellular site equipment through a remote desktop connection. The system includes an onsite computer connected to onsite switching and data equipment for the cellular site. The onsite computer establishing a network connection through an array of hotspots provided by mobile data operators. The system disabling the hotspot of the mobile data operator of the cellular site being upgraded. The onsite computer then being accessed by an offsite computer to initiate and administrator the equipment updates using offsite personnel.

16 Claims, 3 Drawing Sheets

US 11,659,414 B1

CONNECTIVITY APPARATUS FOR REMOTE CELL TOWER INTEGRATION

CROSS-REFERENCE TO RELATED APPLICATIONS

This nonprovisional application is a divisional of and claims priority to nonprovisional application Ser. No. 16/566,479, entitled "Connectivity Apparatus for Remote Cell Tower Integration," filed Sep. 10, 2019, which is a continuation of and claims priority to nonprovisional application Ser. No. 16/104,304, entitled "Connectivity Apparatus for Remote Cell Tower Integration," filed Aug. 17, 2018, which is a continuation of and claims priority to provisional application No. 62/546,614, entitled "Connectivity Apparatus for Remote Cell Tower Integration," filed Aug. 17, 2017, each of which shares inventorship, the entireties of which are incorporated herein by reference.

BACKGROUND OF THE INVENTION

1. Field of the Invention

This invention relates, generally, to data connectivity. More specifically, it relates to remote access connectivity for cellular tower site integration services.

2. Brief Description of the Prior Art

Cellular (or "cell") site equipment periodically requires software and hardware upgrades to keep pace with constantly evolving technology. Currently, a cell site technician (or "integrator") is dispatched to physically go to the cell site. During the software installation or upgrade process, the cell site technician is idle, waiting for the installation or upgrade to install. The process is largely inefficient with respect to the technician's time.

IT engineers that maintain large arrays of computers frequently access them remotely such as through remote desktop software. Remote desktop software allows the desktop of a remote computer to be displayed on a local computer. Some exemplary remote desktop protocols include:

Apple Remote Desktop Protocol (ARD) - an original protocol for Apple Remote Desktop on MacOS machines;
Appliance Link Protocol (ALP) - a Sun Microsystems-specific protocol;
HP Remote Graphics Software (RGS) - designed by Hewlett-Packard specifically for high end workstations;
Independent Computing Architecture (ICA) - designed by Citrix Systems;
PC-over-IP (PCoIP) - a protocol used by VMware;
Remote Desktop Protocol (RDP) - specific to MICROSOFT Windows;
SPICE (Simple Protocol for Independent Computing Environments) - remote-display system; and
X Window System (X11) - a cross-platform protocol mainly used for displaying local applications.

A solution for the idle cell tower integrator is to have them upgrade the cell tower equipment remotely. That way they would not have to physically travel on-site and wait for the upgrade process to complete. Unfortunately, there are several problems with this solution. First, the cell tower equipment (such as that sold under the brand ERICSSON and NOKIA) is proprietary and highly secure. Therefore, it is not generally possible to load and run remotely accessible desktop software on the equipment itself. Even if the remote desktop software was enabled on the equipment, the upgrade process itself usually requires disconnection, reboot and thus an inherent loss of network connectivity. When the technician is onsite, they can re-establish the connection. However, from an administrative location, it may be difficult or impossible to reconnect remotely.

Because of the proprietary nature of the cell site equipment, the cell site integrator generally connects a portable computing device with the necessary administrative software for the onsite equipment upgrade. The portable computing device is connected via USB, Ethernet, serial, optical, or other wired connection to the onsite equipment. When the integrator is onsite, he or she executes the upgrade process, and subsequently "babysits" the equipment until the procedure is finished. The integrator often has no need for an Internet connection through this process.

If the integration was to run remotely, the Internet connection would likely be established by a 3G or 4G hotspot. However, during the upgrade process, the very tower that is transceiving the data for the 3g or 4G hotspot temporarily is disabled. The break in connectivity could lead to a failed upgrade process and result in a loss of service for the entire cell site.

Accordingly, what is needed in the art is a solution to give cell site integrators remote access to upgrade onsite equipment. In addition, there is a need for a solution to provide robust, wireless remote desktop connectivity at cell sites. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system and method of remotely integrating with and updating a cell site without a loss in connectivity is now met by a new, useful, and nonobvious invention.

An embodiment of the method of the present invention includes the step of wirelessly connecting an off-site computing node disposed at an administrative location with an on-site computing node disposed at the cell tower site. The cell tower site is in electronic communication with a plurality of hotspot networks, with each of the hotspot networks being connected to an internet network. The method also includes the step of scanning, through the on-site computing node, through the plurality of hotspot networks to select one of the plurality of hotspot networks for a wireless connection. The selected hotspot network is the network that provides an optimal hotspot network connection that is based on at least one of a connection strength, a connection speed, and a connection consistency associated with each of the plurality of hotspot networks.

The method includes the step of wirelessly connecting the on-site computing node to the selected one of the plurality of hotspot networks, such that the on-site computing node is connected to the internet network. Via the selected one of the plurality of hotspot networks, maintenance on the cell tower site can be remotely performed by altering at least one of a software component of the on-site computer and a software component of one of the plurality of hotspot networks. The maintenance performed on the cell tower site is selected from the group consisting of installing a file to update or upgrade the cell tower site, and removing a file to downgrade or repair the cell tower site. In an embodiment, the maintenance is performed on one of the plurality of hotspot networks, thereby allowing an off-site integrator to remotely access and update one of the hotspot networks by using an internet connection provided by one of the other hotspot networks. Such a system prevents the need for closing down an entire cell tower site to perform maintenance.

According to an embodiment of the present invention, during the scanning step, the method includes the steps of determining which of the plurality of hotspot networks requires maintenance, and removing the hotspot network that requires maintenance from a list of available hotspot connections. As such, the method prevents the on-site computer from connecting to the removed hotspot network, thereby ensuring a consistent connection during the maintenance process. In addition, if the selected hotspot network fails to provide an optimal hotspot network connection, the method includes the step of selecting and connecting to another of the plurality of hotspot networks. In an embodiment, the method includes the step of monitoring the plurality of hotspot networks to help ensure that the optimal hotspot network connection is selected at a given time. The monitoring step, and the scanning step, may include a step of pinging each of the plurality of hotspot networks to determine the optimal hotspot network connection.

In an embodiment of the present invention, a remote data connectivity system is provided, including an off-site computing node disposed at an administrative location and an on-site computing node disposed at a cell tower site. Each of the computing nodes includes a processor communicatively coupled to a memory. The on-site computing node also includes a network switcher in electronic communication with the processor, with the network switcher in wireless communication with a plurality of hotspot networks. The system also includes a remote desktop protocol adapted to run on the on-site computing node and provide a wireless and electronic connection between the off-site computing node and the on-site computing node. The network switcher is adapted to ping each of the plurality of hotspot networks to determine an optimal hotspot network connection for the on-site computing node. In addition, the network switcher is adapted to disconnect the on-site computing node from the one of the plurality of hotspot networks and connect the on-site computing node to another of the plurality of hotspot networks if the selected hotspot network does not provide the optimal hotspot network connection. The on-site computing node is adapted to connect to one of the plurality of hotspot networks, thereby providing an internet connection for the on-site computing node. In an embodiment, the system may include a maintenance installation data package downloadable on the on-site computer, with the maintenance installation data package being disposed to update one of the plurality of hotspot networks. In this embodiment, the network switcher disables the hotspot network to receive the maintenance installation data package, such that the on-site computer connects to a different hotspot network.

An embodiment of the present invention includes a software application installed on a portable computing device having ports to establish connectivity to cell site equipment. The portable computing device has at least two wireless data transceivers subscribed to two independent wireless carriers. The software application monitors the connectivity of the at least two transceivers to fail-over to a second wireless carrier in the event that adequate connectivity is lost to the first wireless carrier.

In practice, the portable computing device is connected onsite during the upgrade process and is turned on. At least one Internet connection is established through a wireless hotspot device on the portable computing device. An offsite integrator at an administrative location then initiates a remote desktop session to the portable computing device, and initiates the upgrade process to the cell site equipment. While the upgrading process is running, the integrator can attend to other duties, including, but not limited to, upgrading other cell sites remotely in a concurrent fashion.

An object of the invention is to provide for a consistent wireless connection between a cell site and one of a plurality of wireless carriers, such that in the event that a connection is lost, the cell site can transfer over to a different wireless carrier. An additional object is to provide for remote access to a cell site, thereby allowing an integrator to easily and efficiently perform upgrades to a cell site while attending to other duties simultaneously.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes an apparatus and method of providing a consistent wireless connection between a cell site and one of a plurality of wireless carriers, allowing a technician, or an integrator, to efficiently perform work on one of the plurality of wireless carriers (i.e., upgrading and/or updating a component of the network). The present invention also includes an apparatus and method of proving a remote connection through which the integrator can connect to the cell site without the need to physically travel to the site, thereby improving the integrator's (and, ultimately, the cell site's) efficiency.

Figure 1:
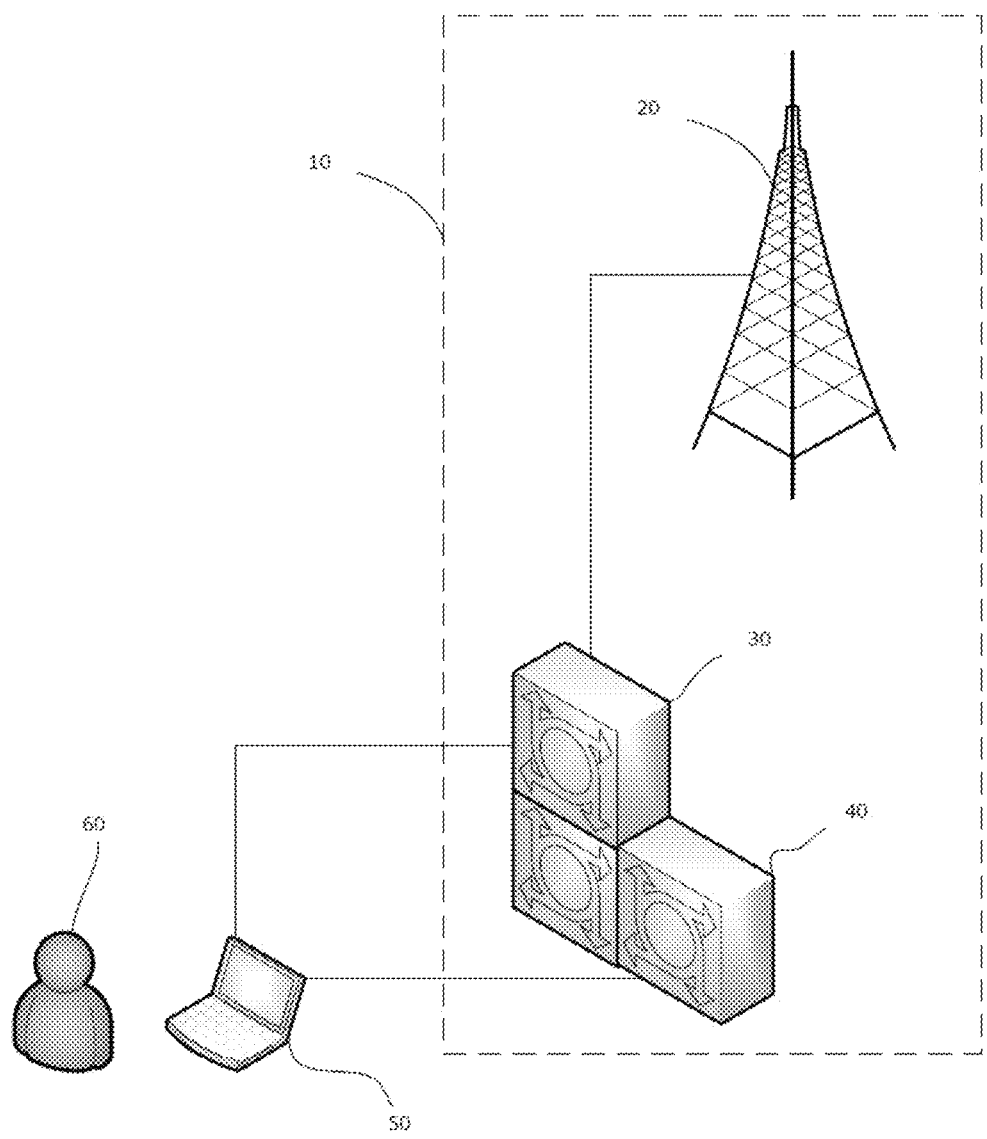
FIG. 1 is a diagrammatic view of the prior art method of cell tower site integration activity.

FIG. 1 shows cell tower site 10 having antenna structure 20 coupled to data and switching equipment 30 and 40. On-site integrator 60 uses portable computer 50 which is connected to data and switching equipment 30 and 40 to process software installations and updates. As noted previously, on-site integrator 60 spends much of the time idle, waiting for equipment 30/40 to process the upgrade and/or update instructions.

Figure 2:
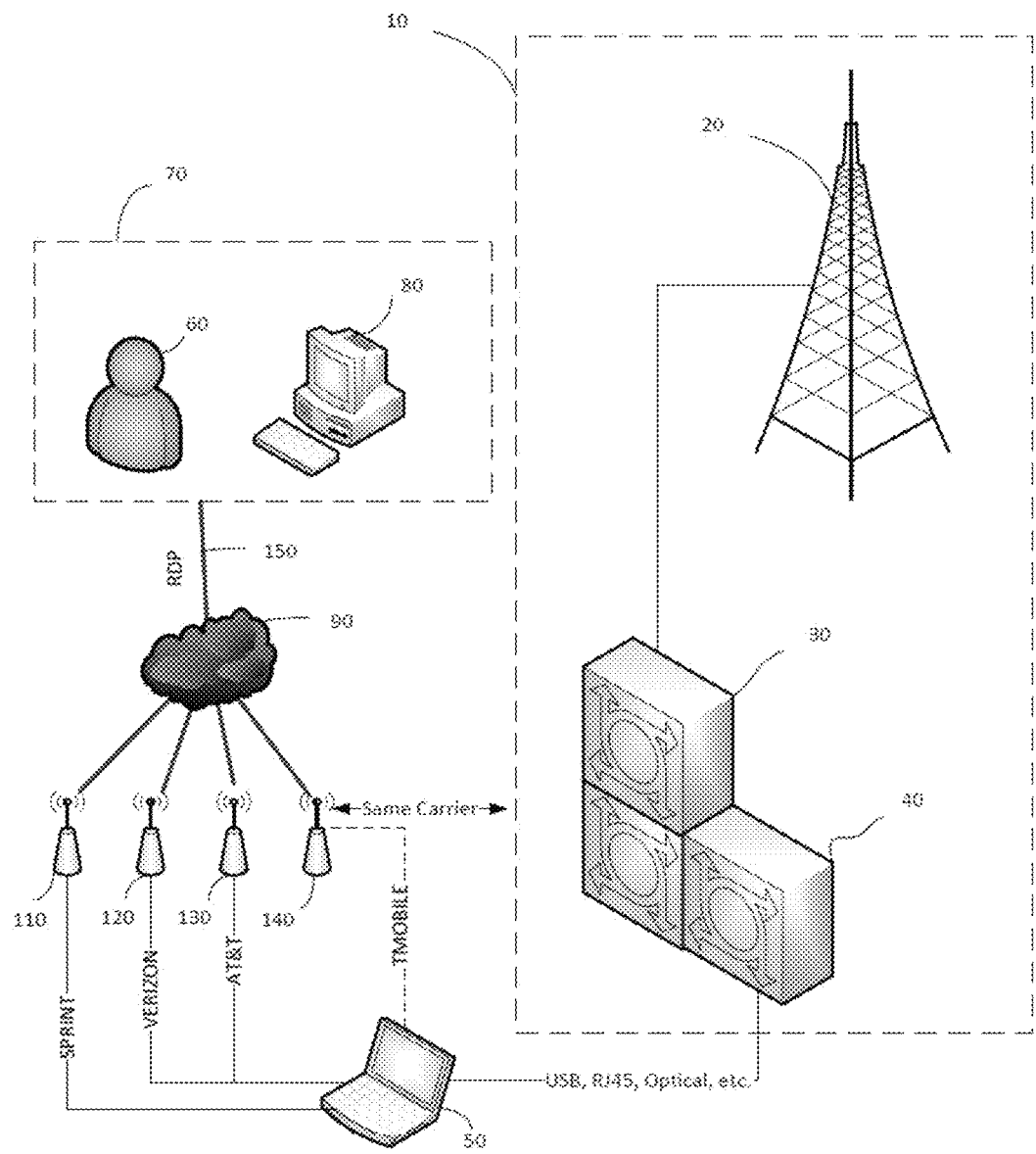
FIG. 2 is a diagrammatic view of an embodiment of the invention.

FIG. 2 shows an embodiment of the invention wherein integrator 60 is no longer "on-site" but stationed remotely from cell tower site 10 at administrative location 70. Portable computer 50 is still coupled to equipment 30/40 but on-site computer 50 is accessed through remote desktop protocol (RDP) 150 wherein local computer 80 engaged by integrator 60 displays the desktop emulation of on-site computer 50 including the proprietary upgrade/update software typically provided by the vendors/manufacturers of equipment 30/40.

The RDP connection requires a data connection which is typically made through the public Internet 90. On-site computer 50 is coupled to a plurality of hotspot devices that are subscribed to different mobile data operators. For example, some mobile data operators provide services under the brand names SPRINT, VERIZON, AT&T and TMOBILE. Software installed on on-site computer 50 monitors and analyzes the plurality of hotspot devices to determine a hotspot to which it can connect. In addition, the software cycles through the plurality of hotspot devices and selects the strongest and/or most consistent connection, which would thereby allow the installation, upgrade, update, or other project to be performed on at least a portion of cell site 10.

However, a unique issue that arises during integrator updates and upgrades is that the cell tower equipment may be temporarily taken offline or may drop in connection for a variety of reasons. For example, one or more of the plurality of hotspot devices may experience an interruption in connectivity, thereby decreasing connection strength and speed, or pausing connectivity altogether. One such interruption occurs if the hotspot device to which on-site computer 50 connects is the hotspot device that is receiving an update or upgrade—during the installation process, the hotspot device often must restart or otherwise cease wireless connectivity for a period of time.

Thus, if the equipment services a SPRINT data connection, then using a hotspot on the SPRINT carrier may lead to an interruption in the RDP session and require the off-site integrator to travel to the on-site computer to resume the upgrade process. This can lead to a significant disruption and delay in the integration process. Therefore, according to an embodiment of the invention, within the array of hotspot devices, the software disables the hotspot connection for the affected carrier of the cell site equipment for that particular integration. This prevents initially establishing an RDP session 150 only to lose it at the worst possible time, such as in the middle of an update/upgrade.

The equipment for the hotspot array (110, 120, 130 and 140) may be internally-integrated into a portable computer with additional hotspot devices plugged into USB ports in the computer. Alternatively, a USB hub with two or more hotspot USB devices may be collectively connected by one USB connection to the portable computer 50. Finally, a stand-alone device housing the hotspot array equipment may be provided that is connected by WiFi, Bluetooth, or Ethernet to portable computer 50.

In an exemplary embodiment of the invention, software on portable computer 50 running the WINDOWS operating system may access an API to enumerate the WiFi access points provided by hotspot array. An individual hotspot having a signal significantly stronger than the rest of the array may be automatically disabled prior to the initiation of the RDP session, the presumption being that the high-signal is coming from the local cell site which may be temporarily brought down in the update process. In FIG. 2, cell site 10 provides services to carrier TMOBILE. Accordingly, hotspot 140 for TMOBILE is either manually or automatically disabled by portable computer 50 to prevent disruption in the RDP session. One of the remaining hotspots 110-130 may be selected by logic of the best ping response, strongest signal, or some other connectivity analytic. In addition to the initial disabling of the hotspot being updated, the software monitors the wireless connections associated with the remaining hotspots to determine the strongest and most consistent connection. As such, if the connection strength or speed from the connected hotspot drops below a threshold value, or below the strength or speed of one of the other hotspots, then the software may switch the wireless connection to one of the other hotspots.

Onsite computer 50 will typically get a dynamic IP address from hotspot array so an embodiment of the invention anticipates having a DNS application so that offsite integrator 60 can establish RDP session 150 with onsite computer 50.

Figure 3:
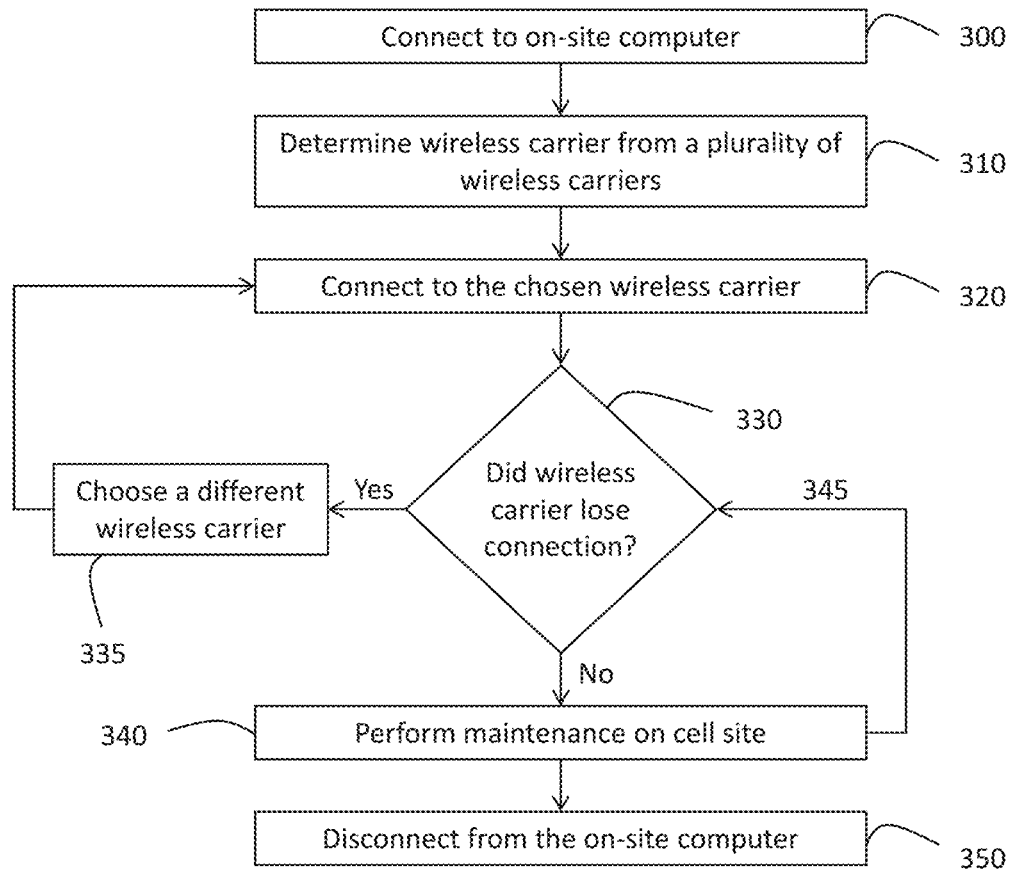
FIG. 3 is a process-flow diagram depicting a method of integrating with a cell site according to an embodiment of the invention.

Referring now to FIG. 3, in conjunction with FIG. 2, an exemplary process-flow diagram is provided, depicting a method of remotely integrating with cell site 10 without an interruption in wireless connection. The steps delineated in the exemplary process-flow diagram of FIG. 3 are merely exemplary of an order of remotely integrating with cell site 10, and the steps may be carried out in another order, with or without additional steps included therein.

As shown in FIG. 3, the method of remote integration begins at step 300, during which an integrator connects to computer 50 on cell site 10. The connection can be performed physically or remotely, depending on the location of integrator 60 with respect to cell site 10. For example, if integrator 60 is not physically near cell site 10 to create a physical connection with on-site computer 50 at the site, integrator 60 can remotely connect to the computer via RDP 150, as discussed in detail above.

The method proceeds to step 310, during which the on-site computer searches through a plurality of wireless carriers to determine a wireless carrier to which the computer connects. The determination of a wireless carrier depends on a number of factors, such as the strength and consistency of the signal emitted from the wireless carrier and received by the computer. When the wireless carrier having the strongest and most consistent signal is determined, the computer connects to the chosen wireless carrier during step 320, such that the computer can send and receive data wirelessly via the carrier.

At times, the wireless carrier determined and selected during step 310 will drop or lose connection, causing the computer to lose connection as well. During work performed on a cell site, this loss of connection often occurs because the work is related to maintenance of one of the wireless carriers—for example, upgrading and/or updating a component of the network associated with the wireless carrier. If the computer chose the wireless carrier to receive maintenance, then the computer will have to find a different wireless carrier to continue working on the cell site. Alternatively, the selected wireless carrier may simply lose connection due to interruptions in network connectivity or interruptions in signal transmission. As such, during step 330, the computer analyzes whether the wireless connection between the computer and the wireless carrier degraded by dropping or losing connection, or otherwise experienced a reduction in signal, such that a different wireless carrier would provide a more secure and stronger connection. If the computer experienced signal loss, then during step 335, the computer selects a different wireless carrier from that selected during step 310. After the computer selects the different wireless carrier, the method repeats step 320, in which the computer connects to the selected wireless carrier.

Once the computer has a strong and consistent wireless connection to a wireless carrier, regardless of whether a new wireless carrier had to be selected, the method proceeds to step 340, during which the cell site receives the maintenance that required the integrator to connect to the computer. As shown in FIG. 3, the computer continues to monitor the wireless connection to the selected wireless carrier during the maintenance process. The monitoring process is described as step 345 in FIG. 3. Finally, once the maintenance process is complete, and the integrator has performed the necessary work on the cell site, the integrator disconnects from the on-site computer during step 350.

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic, or the like, and conventional procedural programming languages, such as the "C" programming language, or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

Glossary of Claim Terms Administrative location: is an off-site location, remotely disposed from a cell tower site, at which an administrator, or integrator, can remotely interact with the cell tower site.

Cell tower site: is a mobile device site including antennae and communications equipment that creates a cellular network, to which computing nodes can connect.

Computing node: is an electronic device capable of communicating with electronic communications networks.

Hotspot network: is a location at which a computing node can connect to the internet, such as via a wireless carrier.

Maintenance: is an update, upgrade, installation, downgrade, removal, or other function performed to change a software component of a cell tower site or a hotspot network.

Off-site: located away from the cell tower site.

On-site: located at or adjacent to the cell tower site.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of selecting a hotspot device to which to connect, the method comprising the steps of:
   wirelessly connecting an off-site computing node to an on-site computing node via a remote desktop protocol on the off-site computing node, the on-site computing node including a plurality of hotspot devices physically coupled to the on-site computing node, each of the plurality of hotspot devices associated with a different mobile data operator and including an associated mobile hotspot based on the mobile data operator;
   utilizing the remote desktop protocol from the off-site computing node, scanning, through the on-site computing node, through the plurality of mobile hotspots to select one of the plurality of hotspot devices to which to form a wireless connection via the associated mobile hotspot; and
   utilizing the remote desktop protocol from the off-site computing node, wirelessly connecting the on-site computing node to the selected one of the plurality of hotspot devices, such that the on-site computing node is connected to one of the plurality of mobile data operators via the associated one of the plurality of mobile hotspots.

2. The method of claim 1, wherein the step of scanning through the plurality of hotspot networks further comprises the steps of:
   determining one of the plurality of hotspot devices to receive maintenance; and
   removing the mobile hotspot associated with the determined one of the plurality of hotspot devices that receives maintenance from a list of available mobile hotspot connections, thereby preventing the on-site computing node from connecting to the hotspot device and its associated mobile hotspot.

3. The method of claim 1, further comprising the step of:
   if, after selecting one of the plurality of hotspot devices, the selected hotspot device fails to provide an optimal mobile hotspot connection to its associated mobile hotspot, the optimal mobile hotspot connection based on at least one of a connection strength, a connection speed, and a connection consistency associated with each of the plurality of hotspot devices, disconnecting from the selected hotspot device; and
   selecting and connecting to another of the plurality of hotspot devices.

4. The method of claim 1, wherein the step of scanning through the plurality of mobile hotspots further comprises the step of pinging each of the plurality of hotspot devices to determine an optimal mobile hotspot connection, the optimal mobile hotspot connection based on at least one of a connection strength, a connection speed, and a connection consistency associated with each of the plurality of hotspot devices.

5. The method of claim 1, further comprising the step of monitoring, through the on-site computing node, the plurality of hotspot devices to ensure that the selected hotspot device provides an optimal mobile hotspot connection, the optimal mobile hotspot connection based on at least one of a connection strength, a connection speed, and a connection consistency associated with each of the plurality of hotspot devices.

6. The method of claim 5, wherein the step of monitoring the plurality of hotspot devices further comprises the step of pinging each of the plurality of hotspot devices to determine the optimal mobile hotspot connection.

7. The method of claim 5, further comprising the steps of:
   if, after selecting one of the plurality of hotspot devices, the selected hotspot device fails to provide the optimal mobile hotspot connection, disconnecting from the selected hotspot device; and
   selecting and connecting to another of the plurality of hotspot devices.

8. The method of claim 1, further comprising the step of, via the selected one of the plurality of mobile hotspots, utilizing the remote desktop protocol from the off-site computing node, remotely performing maintenance on the on-site computing node by altering at least one of a software component of the on-site computer and a software component of one of the plurality of hotspot devices.

9. A method of selecting a hotspot device to which to connect, the method comprising the steps of:
   receiving, on an on-site computing node, a request from an off-site computing node to form a wireless connection between the on-site computing node and the off-site computing node, the on-site computing node including a plurality of hotspot devices physically coupled to the on-site computing node, each of the plurality of hotspot devices associated with a different mobile data operator and including an associated mobile hotspot based on the mobile data operator;
   accepting, from the on-site computing node, the request from the off-site computing node to form the wireless connection, the connection providing access from the off-site computing node to the on-site computing node via a remote desktop protocol;
   scanning, from the on-site computing node, through the plurality of mobile hotspots to determine an optimal mobile hotspot connection, the optimal mobile hotspot connection based on at least one of a connection strength, a connection speed, and a connection consistency associated with each of the plurality of hotspot devices;

selecting the hotspot device from the plurality of hotspot devices that is associated with the one of the plurality of mobile hotspots having the optimal mobile hotspot connection; and connecting the on-site computing node to the selected hotspot device via its associated mobile hotspot, such that the on-site computing node is connected to the mobile data operator associated with the selected hotspot device.

10. The method of claim 9, wherein the step of scanning through the plurality of hotspot networks further comprises the steps of:

determining one of the plurality of hotspot devices to receive maintenance; and removing the mobile hotspot associated with the determined one of the plurality of hotspot devices that receives maintenance from a list of available mobile hotspot connections, thereby preventing the on-site computing node from connecting to the hotspot device and its associated mobile hotspot.

11. The method of claim 9, further comprising the step of:

if, after selecting one of the plurality of hotspot devices, the selected hotspot device fails to provide the optimal mobile hotspot connection, selecting and connecting to another of the plurality of hotspot devices.

12. The method of claim 9, wherein the step of scanning through the plurality of mobile hotspots further comprises the step of pinging each of the plurality of hotspot devices to determine the optimal mobile hotspot connection.

13. The method of claim 9, further comprising the step of monitoring, through the on-site computing node, the plurality of hotspot devices to ensure that the selected hotspot device provides the optimal mobile hotspot connection.

14. The method of claim 13, wherein the step of monitoring the plurality of hotspot devices further comprises the step of pinging each of the plurality of hotspot devices to determine the optimal mobile hotspot connection.

15. The method of claim 13, further comprising the steps of:

if, after selecting one of the plurality of hotspot devices, the selected hotspot device fails to provide the optimal mobile hotspot connection, disconnecting from the selected hotspot device; and selecting and connecting to another of the plurality of hotspot devices.

16. The method of claim 9, further comprising the step of, via the selected one of the plurality of hotspot devices, remotely performing maintenance on the on-site computing node by altering at least one of a software component of the on-site computer and a software component of one of the plurality of hotspot devices.

* * * * *